(No Model.)

A. C. SMITH.
VEHICLE HUB.

No. 247,521. Patented Sept. 27, 1881.

WITNESSES
Wm A. Skinkle
Jos. S. Latimer

INVENTOR
Alonzo C. Smith.
By his Attorneys
Baldwin, Hopkins & Peyton

UNITED STATES PATENT OFFICE.

ALONZO C. SMITH, OF DOWAGIAC, MICHIGAN.

VEHICLE-HUB.

SPECIFICATION forming part of Letters Patent No. 247,521, dated September 27, 1881.

Application filed June 2, 1881. (No model.)

*To all whom it may concern:*

Be it known that I, ALONZO C. SMITH, of Dowagiac, in the county of Cass and State of Michigan, have invented certain new and useful Improvements in Vehicle-Hubs, of which the following is a specification.

Figure 1:
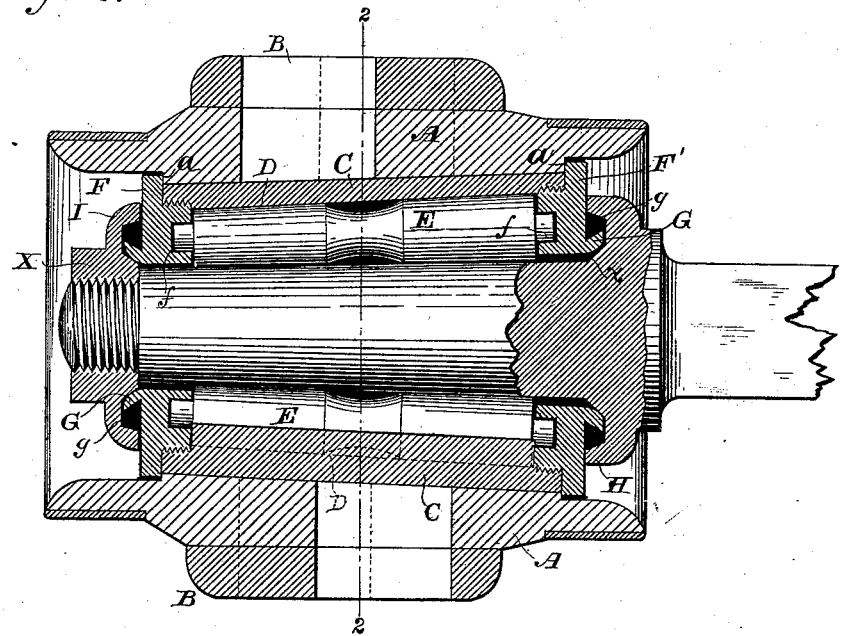
Figure 2:
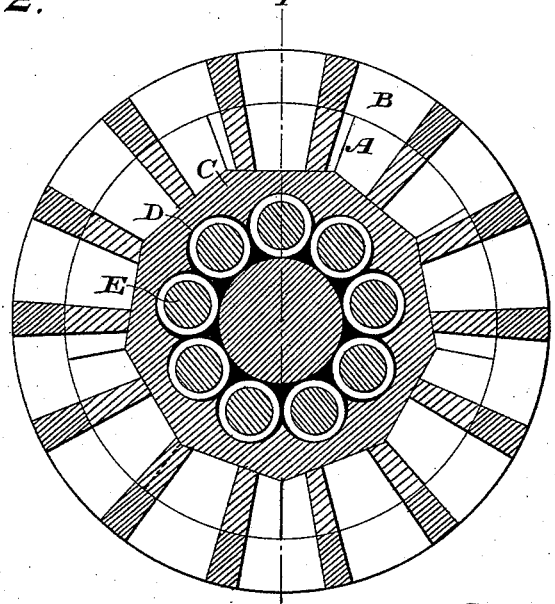

In the accompanying drawings, Figure 1 is a longitudinal central section of the complete hub on the line 1 1 of Fig. 2, and Fig. 2 a cross-section on the line 2 2 of Fig. 1.

A is the wooden body of the hub, around which passes a metallic band, B, both of which are mortised to form seats for the spokes. A metallic box, C, of a polygonal shape in cross-section, fits securely in the correspondingly-shaped socket of the hub-body A, and is provided with longitudinal grooves D for the reception of the anti-friction rollers E. The box is slightly conical in longitudinal section, and its socket in the hub-body is correspondingly shaped, so that it can be driven into a firm snug seat. The rollers E are journaled in annular grooves $f$ in the screw-caps F F'. These caps overlap the box C and bear against shoulders $a$ on the hub-body to prevent end-thrust of the box in its seat. The rollers, which are also slightly conical, are reduced in size at or about the middle, as shown, so as to form a space for the lubricant and to reduce the extent of bearing-surface. The threads of the screw-cap F and the nut X on the outer end of the axle are reversed to prevent them from being run off. Sand bands or flanges G G upon the screw-caps are flared or outwardly inclined, so as to form annular recesses or depressions $g$ $g$, which catch grit and dirt and prevent it from entering the bearing. The inner side of the nut X is beveled, so as to fit snugly within the annular flange G, and the axle-skein is similarly inclined at $x$, so as to fit the opposite flange on the inner screw-cap. I also form on the skein and nut guard-flanges H and I, which approach the screw-caps very closely, although it is best they should not be actually in contact with them. By this construction the entrance of dirt and grit to the bearing is prevented.

The hub-body is made in sections, as shown in the drawings, and set up after the manner of a keg, the band B being either driven or shrunk thereon. The conical polygonal shape of the box-socket is thus readily obtained and the construction of the hub cheapened. When the box is driven to its seat the parts will be firmly and compactly united.

The box may, of course, be of any usual shape and secured in place in usual ways, and might be made without the grooves for the anti-friction rollers.

Having thus described my invention, what I claim as new, and desire to secure by Letters Patent, is—

1. A hub formed of sections and united, as described, by a metallic band, substantially as set forth.

2. The combination, substantially as herein set forth, of the hub-body, the box, the anti-friction rollers, and the caps or ends of the box having the annular grooves in which the rollers are journaled.

3. The combination, substantially as herein set forth, of the hub-body, the box having the internal longitudinal grooves, the anti-friction rollers, and the caps of the box having the annular grooves.

4. The combination, substantially as herein set forth, of the box having the outwardly-flaring guards or flanges (the ends of the box being otherwise plane) with the skein and nut having the overlapping flanges H and I, there being an annular space between the flanges on the box and those on the nut and skein.

5. The combination, substantially as herein set forth, of the box having the outwardly-inclined flanges, as described, the nut beveled to fit within the outer flange, and the axle-skein inclined, as described, to fit within the opposite flange.

6. The combination, substantially as described, of the box, the inclined guard-flanges, the beveled nut and skein, and the guard-flanges on the nut and skein.

In testimony whereof I have hereunto subscribed my name.

ALONZO C. SMITH.

Witnesses:
LYMAN V. ROUSE,
F. J. ATWELL.